US009792581B1

(12) United States Patent
Mendola et al.

(10) Patent No.: US 9,792,581 B1
(45) Date of Patent: Oct. 17, 2017

(54) DYNAMIC MARKER RESPONSIVE TO EMITTED LIGHT

(71) Applicant: Amazon Technologies, Inc., Seattle, WA (US)

(72) Inventors: Sergio Mendola, Georgetown, MA (US); Henry C. Yan, Seattle, WA (US)

(73) Assignee: Amazon Technologies, Inc., Seatle, WA (US)

( * ) Notice: Subject to any disclaimer, the term of this patent is extended or adjusted under 35 U.S.C. 154(b) by 0 days.

(21) Appl. No.: 15/188,771

(22) Filed: Jun. 21, 2016

(51) Int. Cl.
| G06K 5/00 | (2006.01) |
| G06Q 10/08 | (2012.01) |
| G06K 7/10 | (2006.01) |
| G06K 19/06 | (2006.01) |

(52) U.S. Cl.
CPC ....... *G06Q 10/087* (2013.01); *G06K 7/10861* (2013.01); *G06K 19/06028* (2013.01)

(58) Field of Classification Search
CPC .......... G06K 5/00; G06K 19/00; G06F 17/00; G06F 19/00; G06Q 30/00; G06Q 90/00
USPC ................................ 235/382, 375, 487, 385
See application file for complete search history.

(56) References Cited

U.S. PATENT DOCUMENTS

| 8,280,547 | B2 | 10/2012 | D'Andrea et al. |
| 9,087,314 | B2 | 7/2015 | Hoffman et al. |
| 2005/0060171 | A1 | 3/2005 | Molnar |
| 2009/0134227 | A1* | 5/2009 | Roth ...................... G06K 19/14 235/491 |
| 2011/0192906 | A1 | 8/2011 | Wilds et al. |
| 2015/0166210 | A1* | 6/2015 | Schram .................. G06Q 90/00 705/500 |
| 2016/0098581 | A1* | 4/2016 | Mart Ascencio ...... G06Q 10/00 340/5.82 |

OTHER PUBLICATIONS

U.S. Appl. No. 15/087,704, filed Mar. 31, 2016, Titled: Inventory Holder Markers for Selective Glowing Based on Received Wavelengths.
U.S. Appl. No. 15/188,746, filed Jun. 21, 2016, Titled: Dynamic Marker Using Disappearing Ink.

(Continued)

*Primary Examiner* — Edwyn Labaze
(74) *Attorney, Agent, or Firm* — Kilpatrick Townsend & Stockton LLP

(57) ABSTRACT

Techniques for improving efficiency of an inventory system are described. In an example, based on instructions of a computing management module of an inventory system, a trigger associated with reading a marker may be triggered. The marker may be attached with an item available from an inventory space and may encode information about the item. The marker may be configured to present, in response to receiving a non-visible light wavelength, a visible indication of an attachment location of the marker. Further, based on the instructions and at least in part on the trigger, a light source may emit the non-visible light wavelength. The emission of the non-visible light wavelength may cause the marker to respond with the visible indication of the attachment location. The visible indication may facilitate a read of the marker by a reader of the inventory system to trigger an inventory action.

20 Claims, 10 Drawing Sheets

(56) References Cited

OTHER PUBLICATIONS

Black Light. Datasheet [online]. Wikipedia, Mar. 9, 2016 [retrieved on Mar. 31, 2016]. Retrieved from the Internet: <URL: https://en.wikipedia.org/wiki/Black_light>, 4 pages.
Clear Neon Magic Invisible UV Reactive Spray Paint for Household and Clothing #1771. [online]. Clear Neon, Sep. 8, 2009 [retrieved on Mar. 31, 2016]. Retrieved from the Internet: <URL: http://www.amazon.com/Invisible-Reactive-Household-Clothing-Eraser/dp/B002OEPJFG>, 6 pages.
Table of Fluorochromes. Datasheet [online]. Salk Institute Center for Cytometry and Molecular Imaging, Oct. 20, 2014 [retrieved on Mar. 31, 2016]. Retrieved from the Internet: <URL: https://web.archive.org/web/20141020225338/http:/pingu.salk.edu:80/flow/fluo.html>, 6 pages.
Thermo Fisher Scientific. "Fluorescence Fundamentals" in *Molecular Probes® Handbook* [online]. Thermo Fisher Scientific, 2010 [retrieved on Mar. 31, 2016]. Retrieved from the Internet: <URL: http://www.thermofisher.com/us/en/home/references/molecular-probes-the-handbook/introduction-to-fluorescence-techniques.html#head3>, 9 pages.

* cited by examiner

DYNAMIC MARKER RESPONSIVE TO EMITTED LIGHT

BACKGROUND

Modern inventory systems, such as those in mail order warehouses, supply chain distribution centers, airport luggage systems, and custom-order manufacturing facilities, face significant challenges in responding to requests for inventory items. To facilitate responding to such requests, many systems utilize automated components to assist human operators in performing actions.

In some systems, a human operator may be tasked with performing different inventory actions with respect to items (e.g., storing a first inventory item in one of many bins on one inventory holder and then storing a second inventory item in a particular bin on another inventory holder). Performing such inventory actions on an item may generally involve scanning at least one marker attached with the item. However, in many situations, there may be many markers attached with the item. Especially when considered collectively, individual mistakes and/or delay by the human operator in identifying what marker to scan, identifying a sequence of scanning markers, or scanning the incorrect marker may result in significant losses in efficiency, throughput, or other metrics of the inventory system. Accordingly, techniques and associated system components for reducing delays and errors in identification by human operators are desirable.

BRIEF DESCRIPTION OF THE DRAWINGS

Various embodiments in accordance with the present disclosure will be described with reference to the drawings, in which.

DETAILED DESCRIPTION

Figure 1:
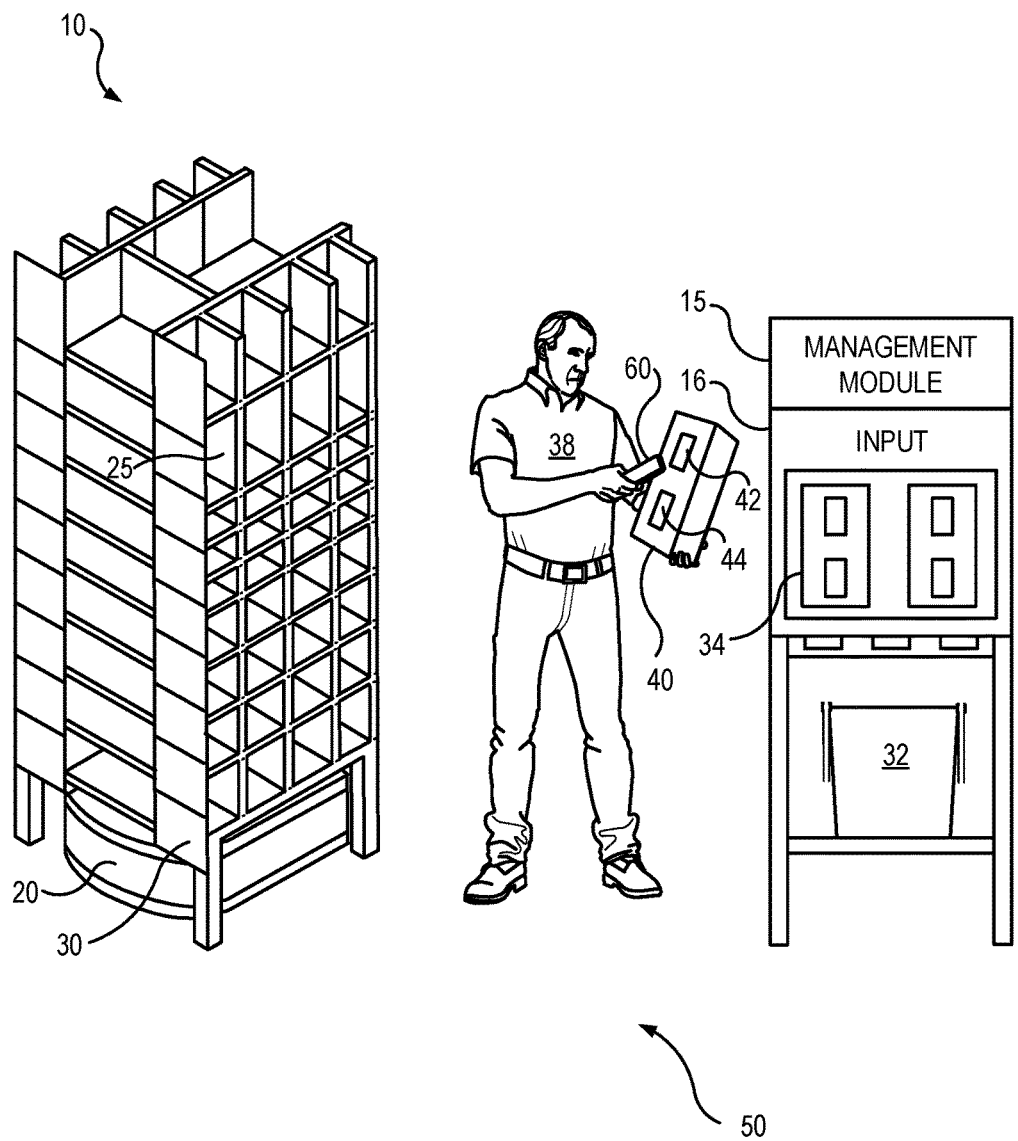
FIG. 1 illustrates a portion of an inventory system that can facilitate selective identification and scan of a marker within the inventory system according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, improving efficiency of an inventory system. In particular, the inventory system may manage the inventorying of items (e.g., storing items in an inventory space). The management may be based partially on markers attached with the items. For example, a marker may encode a unique identifier of the item. The inventory system may maintain a management plan for the item. The management plan may list inventory actions applicable to the item, such as storing the item in a particular bin, removing the item from the bin for addition to a container in order to fulfill a consumer order, and/or other inventory-related actions. By scanning the marker, an operator, such as a human operator or an automated operator, may identify the item, access the management plan, and initiate or execute an applicable inventory action. As further described herein below, many markers may be attached with the item. Each of the markers may encode information about the item and unique to the marker. Hence, when an inventory action needs to be performed, the correct marker may need to be scanned. Scanning the incorrect marker may generally result in errors and degrade the efficiency of the inventory system. For example, such scans may result in incorrect or unusable readings, performance of incorrect inventory actions, and/or other inventory-related errors or challenges.

To improve the efficiency and reduce the errors, dynamic markers may be used in lieu of or in addition to other non-dynamic markers. Generally, a dynamic marker may represent a marker that may have a property that changes under one or more conditions. The property may be associated with a presentation modality of the marker, such as with a visual presentation.

In one example, the dynamic marker may be a temporarily unreadable marker. For instance, the dynamic marker may include a layer of disappearing ink. This layer may obstruct the underlying encoded information for a certain period of time. Thus, the operator may decide not to scan this dynamic marker as being unreadable. Hence, by using such temporarily unreadable markers, the total number of readable markers may be reduced. In turn, the reduction in the total number may increase the efficiency and accuracy associated with identifying the marker(s) that should be scanned. In this example, the inventory system may selectively control which markers should be obstructed with disappearing ink and the lifespan of the applied disappearing ink (e.g., how long should the disappearing ink obstruct a marker before disappearing and rendering the marker readable again).

In another example, the dynamic marker may be a glowing marker. For instance, the dynamic marker may include a layer of ink, paint, coating, and/or other material that may receive ultraviolet light (UV) wavelengths (or other form of wavelength, such as infrared or other wavelength invisible to the human eye). In response to receiving these wavelengths, the layer (and, equivalently, the marker) may glow or otherwise emit light that may be visible to the human eye. In this example, the inventory system may selectively control a light source and parameters of the light emission to glow a particular marker. The glowing marker may allow the operator to efficiently and accurately position the item in space and identify and scan the glowing marker.

To illustrate uses of dynamic markers, consider the following three illustrative examples. In a first example, disappearing ink may be used. In this example, a book may be available to consumers from a storage facility. Two sources of the books may exist. One source may be a publishing house. Another source may be a printing press within the storage facility. For copyright royalties and other reasons, tracking the source of the book may be important. In this example, a cover page of a book obtained from the publishing house may include a barcode (e.g., an example type of a marker) encoding an international standard book number (ISBN) of the book. In comparison, a cover page of a book printed locally at the storage facility may include an ISBN barcode and a second barcode encoding a unique identifier associated with a provider of the storage facility. When an operator is processing a book to fulfill a customer order, the operator may scan a barcode on a cover of the book. In this case, if the book is from the publishing house, only an ISBN barcode may be available for the scan. In comparison, if the book is available from the printing press of the provider, two barcodes are available. In this case, scanning the ISBN barcode may not adequately identify that the book's source is the printing press. Thus, royalty payments may not be properly triggered. However, scanning the second barcode (e.g. the provider-unique barcode) may adequately identify the source. Accordingly, for these books, the operator should scan the second barcode rather than the ISBN barcode. To avoid the need for the operator to identify the second barcode and/or scans of the ISBN barcode, the ISBN barcode may be obstructed with a layer of disappearing ink. For example, this layer may be applied (e.g., printed) on top of the ISBN barcode as part of printing the book at the printing press. By covering the ISBN barcode, only the second barcode may be readable. Thus, the operator may have no other option but to scan the second barcode. Over time, such as by the time the book is delivered to a consumer, the disappearing ink may have disappeared. Hence, from that point on, the ISBN barcode may be available for use (e.g., the consumer may resell the book by scanning the ISBN).

In a second example, disappearing ink may be used. In this example, a customer order is received for an item available from a storage space. The customer order may include personal information that the customer may want to hide. For instance, the personal information may be associated with the customer and/or a recipient of the item, such as a gift message that only the recipient of the item should read, an identifier or address of the customer, and/or an identifier of the recipient. The personal information may be printed using permanent ink and subsequently concealed with a layer of the disappearing ink. Accordingly, an operator of the storage space may not be able to read the personal information. On the other hand, the disappearing ink may fade while the item is in route to the recipient. Accordingly, upon receipt of the item, the personal information may have become visible to the recipient.

In a third example, a glowing marker may be used. In this example, a universal product code (UPC) tag (e.g., an example type of a marker) may be attached with an item. Additionally, a second tag may be attached with the item, where the second tag may encode a serial number of the item. An inventory action may involve storing the item in a bin of the storage facility. This inventory action may rely partially on scanning the UPC tag, rather than the serial number tag. The scan may be performed by way of a handheld reader. Thus, absent the use of a glowing marker (and/or disappearing ink), the operator may not efficiently identify the UPC tag and may even erroneously scan the serial number tag. To avoid this risk, a glowing marker may be used for the UPC tag. The glowing marker may be responsive to a particular UV wavelength. The handheld reader may emit a UV light having that particular wavelength. Accordingly, the UPC tag may glow in response to the UV light, whereas the serial number tag may not, thereby enabling the operator to efficiently identify the UPC tag for the scan.

In the interest of clarity of explanation, embodiments of the present disclosure may be described in connection with a marker attached with an item, where the marker may support an inventory action applicable to the item within a storage facility. However, the embodiments are not limited as such. Instead, the embodiments may similarly apply to any marker, any action facilitated by a marker, and any space. Generally, a marker may include a medium (e.g., a paper, a fabric) encoding information. The marker may be directly attached to a surface of an item or indirectly through an intervening element (e.g., a package that may contain the item). As used herein, the item may include the item itself and, depending on the context, an intervening element. In addition, a marker may be attached with a group of items, rather than a single item. An action may relate to processing the item, such as identifying, inventorying, moving, disposing, or other actions that may be applied to an item. A space may include any location within which an item may exist, such as a storage facility, a warehouse, a supply chain distribution center, an airport luggage system, and/or a custom-order manufacturing facility.

FIG. 1 illustrates a portion of an inventory system 10 that may facilitate selective identification and scan of a marker within the inventory system. As illustrated, the identification and scan may be facilitated by dynamic markers. The dynamic markers may enable an operator, such as a human operator or an automated operator, to more efficiently identify markers that should be scanned and avoid other markers. By doing so, the efficiency of the inventory system 10 may be improved.

In the arrangement shown in FIG. 1, the inventory system 10 may include a station 50, a mobile drive unit 20, an inventory holder 30, and a management module 15. The station 50 may correspond to an area in which an operator 38 may perform actions with respect to the inventory holder 30, e.g., facilitated by functions performed by the management module 15. Although FIG. 1 illustrates a human operator, the operator 38 may be additionally or alternatively an automated operator, such as a robot configured to recognize items and perform inventory actions on the items. In an example, the management module 15 may instruct the mobile drive unit 20 to move the inventory holder 30 to the station 50 so that the operator 38 can perform inventory actions such as picking, counting, or storing items 40 relative to one or more bins 25 of the inventory holder 30.

The management module 15 may utilize one or more suitable input devices 16. The input device 16 is shown in FIG. 1 as a touchscreen configured to allow the operator 38 to make a selection 34 indicating the specific item 40 that may be the subject of an operation by the operator 38. However, the input device 16 may additionally or alternatively include any other suitable components for obtaining information about items 40 and/or storage locations accessible by the operator 38, including, but not limited to, barcode scanners, cameras or other optical sensors, radio frequency identification (RFID) equipment, or keypads. For example, the operator 38 may operate a handheld device 60 (e.g., a scanner) to read (e.g., scan) markers attached with the items 40. The handheld device 60 may be communicatively coupled with the management module 15 over a wireless or wired data communication network. A read of an item 40 may trigger the management module 15 to recognize the item and provide information to the operator 38 via the input device 16 and/or the handheld device 60 about an inventory action applicable to the item 40.

In FIG. 1, the storage locations are represented by bins 25 of the inventory holder 30 and a container 32, although other storage locations are possible. The container 32 may include incoming items 40 for the inventory system 10 or other items 40 to be transferred from the container 32 and stowed, for example, in a bin 25 of the inventory holder 30. Additionally or alternatively, the container 32 may function as a receptacle for collecting items 40 picked from inventory holders 30 for fulfilling orders of the inventory system 10.

A set of markers may be attached to each item 40. Generally, each marker may encode information about a respective item. Encoding the information may follow different formats. For instance, the marker may be a one dimensional barcode, a two dimensional barcode, an RFID tag, or other types of markers. The encoded information may be presented to the operator 38 using one or more presentation modalities, such as visual, audible, and/or tactile presentations. In addition or in the alternative, the presentation may take a non-human readable format. In this case, a read by the handheld device 60 may decode the encoded information. The decoded information may be presented to the operator 38 via the handheld device 60 or the input device 10.

Figure 2:
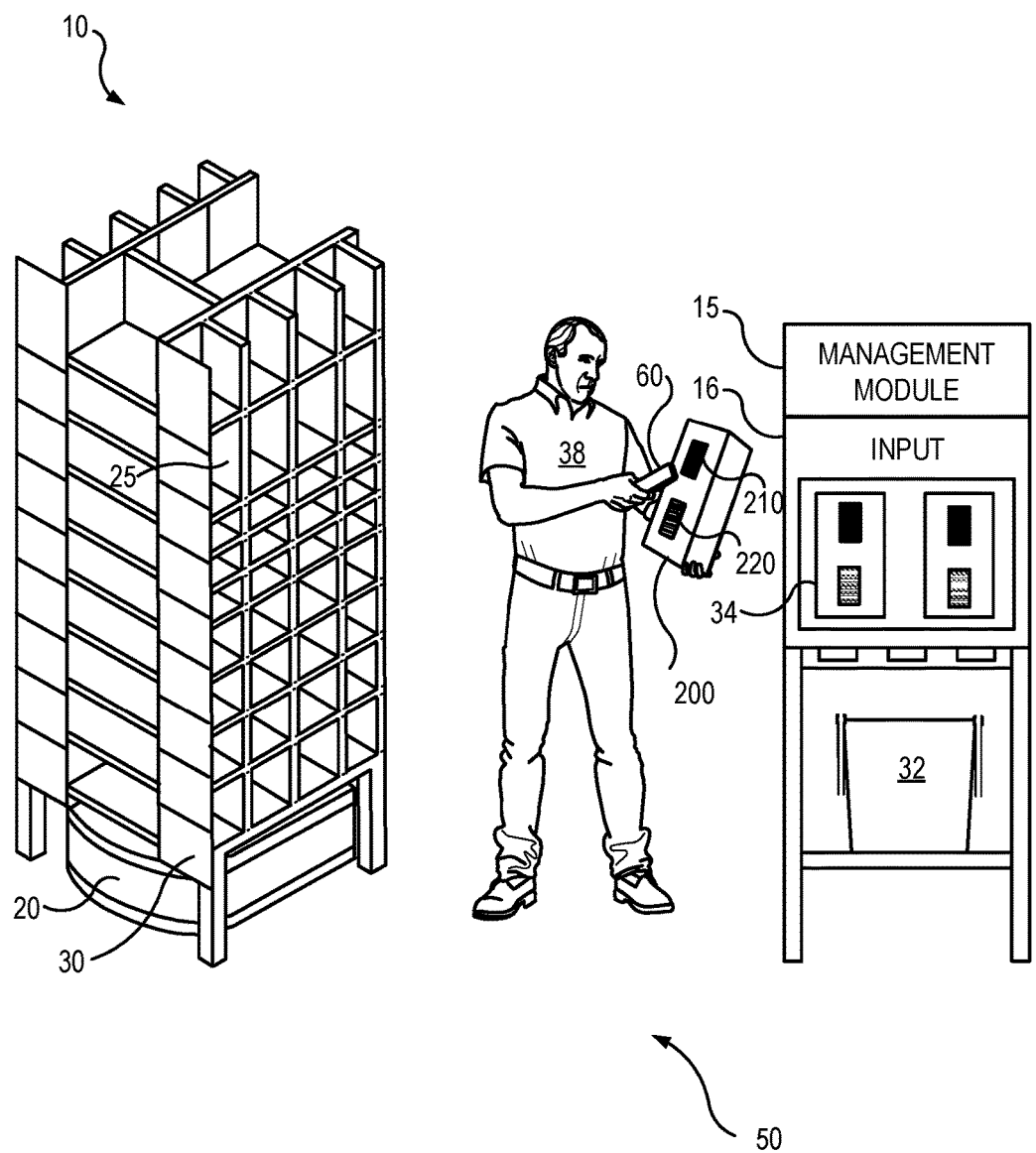
FIG. 2 illustrates an example of a dynamic marker that may encode information about an item, where the information may be temporarily obstructed such that the information may be unreadable for a period of time according to certain embodiments.
Figure 3:
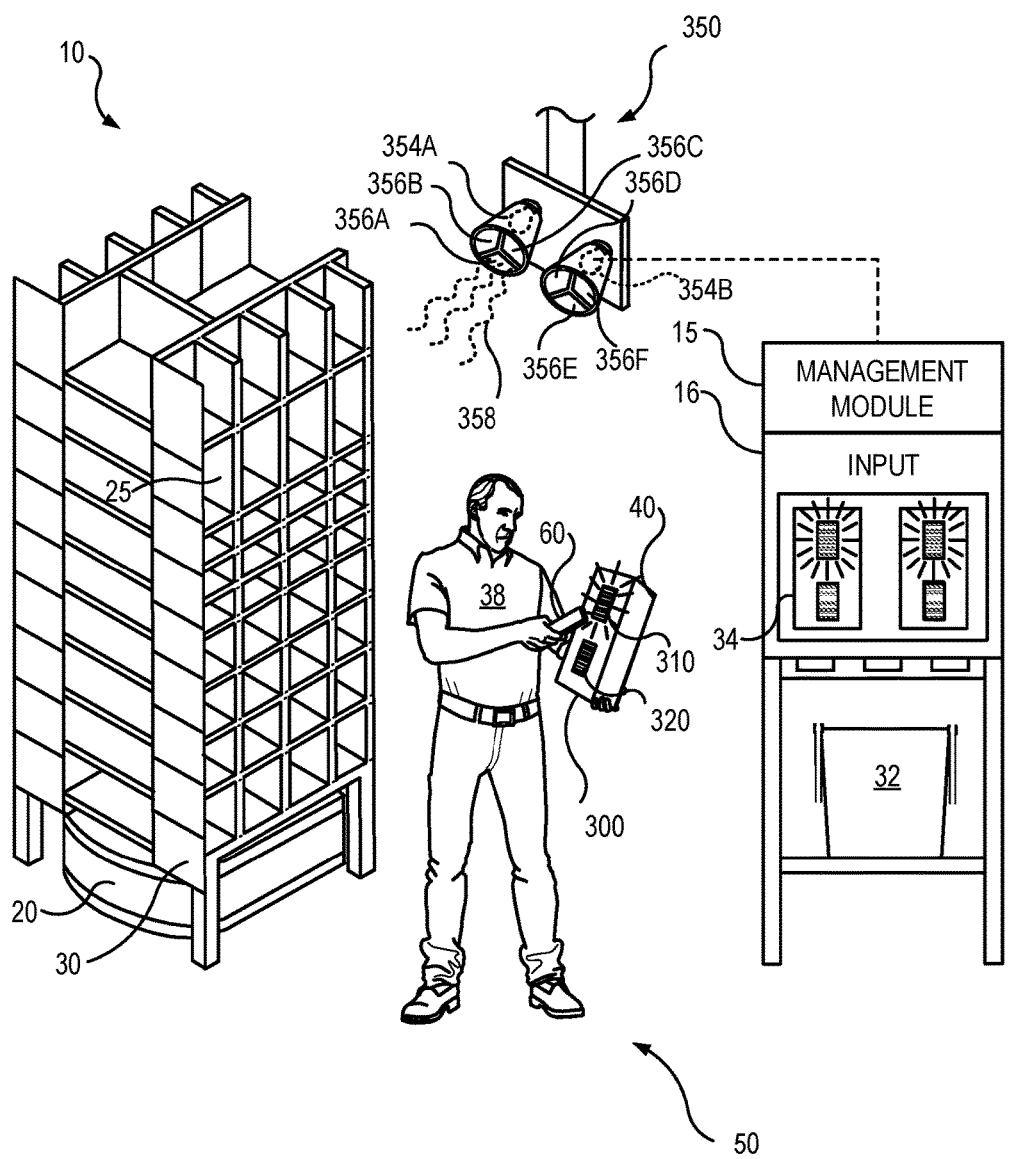
FIG. 3 illustrates an example of another dynamic marker that may encode information about an item, where the dynamic marker may be responsive to emitted light according to certain embodiments.

The number of markers may vary for each item 40. Some of the markers 40 within a set may be dynamic markers. A dynamic marker may change a presentation property under one or more conditions. In an example, the dynamic marker may be unreadable for a period of time, and may become readable upon an elapse of that time. FIG. 2 further illustrates this type of dynamic marker. In another example, the dynamic marker may glow in response to a light at a particular wavelength. FIG. 3 further illustrates this type of dynamic marker. Regardless of the type, the dynamic marker may generally allow the operator 38 to identify a surface of an item 40 where the dynamic marker may be attached such that the operator 38 may position the item 40 to be in a direct line of sight with the handheld device 60, or vice versa. Additionally or alternatively, the dynamic marker may attract the attention of the operator 38 such that the operator 38 may more easily identify the dynamic marker. Depending on the type of the dynamic marker, attracting the attention may enable the operator 38 to read the dynamic marker with the handheld device 60 or skip the reading.

In an illustrative example, the management module 15 may identify a specific item 40 available from the container 32 for the operator 38 to stow in the bin 25. The operator 40 may pick the item 40 from the container 32. A dynamic marker 42 may be attached to the item. Similarly, a regular (e.g., non-dynamic) marker 44 may also be attached to the item.

In a first use case of this illustrative example, the dynamic marker 42 may be non-readable. For instance, the dynamic marker 42 may include a layer of disappearing ink applied over a barcode. In this use case, the operator 38 may only be able to read the regular marker 44. Upon the read of the regular marker 44, the handheld device 60 may decode a unique identifier of the item 40 from the regular marker 44. The handheld device 60 may transmit the unique identifier to the management module 15. The management module 15 may determine that the unique identifier corresponds to the item that should be stowed. Accordingly, the management module 15 may present a positive notification at the input device 10 and/or handheld device 60 informing the operator 38 to proceed with the stowage.

In a second use case of this illustrative example, the dynamic marker 42 may be a glowing marker. In this case, the management module 15 may determine UV light wavelength to which the dynamic marker 42 may be responsive. The management module 15 may instruct the handheld device 60 to emit UV light at that wavelength. As such, a UV light source integrated within the handheld device 60 may respond accordingly. The dynamic marker 42 may glow, whereas the regular marker 44 may not. The glow may allow the operator 38 to ascertain that the dynamic marker 42 should be read (or, alternatively, not read in a different use case). Abiding by this understanding, the operator 38 may read the dynamic marker 42 and thereby receive a positive notification to stow the item 40.

FIG. 2 illustrates an example of a dynamic marker 210 that may encode information about an item 200, where the information may be temporarily obstructed such that the information may be unreadable for a period of time. The dynamic marker 210 may be used within the inventory system 10 of FIG. 1. For ease of reference, this type of dynamic markers may be referred as a temporarily unreadable marker. Being unreadable may refer to the incapability of reading information encoded in the marker. Being temporary may refer to the property of this incapability being temporary and not permanent.

In an example, the temporarily unreadable marker 210 may be formed on a medium, such as paper or fabric. The information may be encoded on the medium using different mechanisms. For instance, barcode-like information encoding may include printing the information in a barcode format using permanent ink on a surface of the medium. An obstructing layer may be applied on top of the encoded information to render the information temporarily unreadable. In an example, the obstructing layer may include disappearing ink.

The disappearing ink may disappear after an elapse of a particular time period (e.g., a fading time period). Once disappeared, the encoded information may become readable again. The length of the fading time period may be predefined depending on a number of factors and may be controlled based on the composition of the disappearing ink. These factors may include, for example, how long the temporarily unreadable marker 210 should remain unreadable. The length of the fading time period may be set to be about or relatively longer than this expected length of time.

Setting the length of the fading time period may be facilitated by varying the composition of the disappearing ink. Generally, disappearing ink may include a combination of an acid-base (pH) indicator (e.g., hymolphthalein for a blue color, phenolphthalein for a red color) and a basic substance (e.g., sodium hydroxide). The combination of the two chemical compounds may be added to a solution (e.g., water and/or alcohol, such as ethyl). The acid-base indicator may have a color (e.g., blue in the case of hymolphthalein) that may transition to another color or become colorless when a pH level of the solution changes (e.g., the transition range of hymolphthalein may be around pH 9.3-10.5). The solution may be initially a base solution, having a proper base pH level (e.g., a pH level over 10.5 for hymolphthalein), rendering the disappearing ink visible (e.g., color blue in the case of hymolphthalein). As the solution reacts with carbon dioxide found in the air, carbonic acid may be formed in the solution, thereby changing the pH level of the solution (e.g., decreasing the pH level below the transition level of the pH indicator, such as below pH 9.3 for hymolphthalein). This change may result in a color transition of the acid-base indicator (e.g., hymolphthalein may become invisible), such that the ink may be considered as having disappeared (e.g., hymolphthalein may become colorless). The length of the fading time period may be adjusted (e.g., prolonged) by varying (e.g., adding) an amount of the basic substance (e.g., sodium hydroxide) in the solution and/or by varying (e.g., reducing) the exposure of the solution to carbon dioxide in the air.

In an example, the temporarily unreadable marker 210 may be attached with an item 200 and may encode information, albeit temporarily unreadable, about this item 200. A regular (e.g., non-dynamic) marker 220 may also be attached with the item 200. Generally, the regular marker 220 may encode another set of information about the item 200. In an example, the regular marker 220 may be formed on a medium by applying permanent ink onto the medium (e.g., for a barcode-like marker).

In an illustrative operational use case, consider the example of a book as the item 200, where the book may be printed within the storage facility. The temporarily unreadable marker 210 and the regular marker 220 may be printed on a cover page of the book. The book may be printed in response to a consumer order for the book and may be expected to be packed into a delivery package within two hours from the print time. Accordingly, the composition of the disappearing ink may be chosen such that the ink may become colorless shortly after two hours from print time. The temporarily unreadable marker 210 may encode an ISBN of the book. The regular marker 220 may encode a provider identifier specific for the book. Hence, once printed, the book may be placed in the container 32. The management module 15 may instruct the operator 38 to pack the book in the delivery package. The operator 38 may pick the book up from the container 32. At that time, only the regular marker 220 may be readable, whereas the temporarily unreadable marker 210 may simply be a solid blue rectangle (or some other color and/or shape). Thus, the operator 38 may operate the handheld device 60 to read the regular marker 220. The management module 15 may receive the read including the provider identifier, confirm that the identified book is the correct book based on the provider identifier, present a positive notification to the operator 38, and log that the book may have been picked up and placed in the delivery package. After the fading time period elapses (e.g., about two hours), the temporarily unreadable marker 210 may become readable because the disappearing ink may have become colorless. At that time, the ISBN code may become readable and usable for subsequent purposes (e.g., for the consumer to resell the book).

FIG. 3 illustrates an example of another dynamic marker 310 that may encode information about an item 300, where the dynamic marker 310 may be responsive to emitted light. The dynamic marker 310 may be used within the inventory system 10 of FIG. 1. For ease of reference, this type of dynamic marker may be referred as a glowing marker. Glowing may refer to the capability of the marker to emit light at a particular wavelength (e.g., one visible to the human eye) in response to the emitted light at another wavelength (e.g., one invisible to the human eye). Although the dynamic marker 310 is described in FIG. 3 as being responsive to emitted light, the response may be to another excitation source and may include other types of responses. For instance, the dynamic marker 310 may vibrate in response to emitted light and/or to an emitted acoustic signal.

In an example, the glowing marker 310 may include material that may project visible light (e.g., between 380 nm and 760 nm in wavelength) in response to receiving a wavelength within a particular range or spectrum. The wavelength may fall within a particular range or frequency that may be a subset of the ultraviolet spectrum (e.g., produced by a "black light" bulb), although other triggering wavelengths may be utilized including infrared or other wavelengths that may be invisible to the unaided human eye (e.g., below 380 nm in wavelength or above 760 nm in wavelength). Generally, glowing marker 310 may be capable of receiving one wavelength (e.g., an invisible wavelength) as an input and emitting another wavelength (e.g., a visible wavelength) as an output. The glowing marker 310 may perform such a wavelength transformation in a passive process that may result from the properties of the glowing marker 310, e.g., without electronic components such as sensors, circuitry, or bulbs incorporated in the glowing marker 310.

For instance, the glowing marker 310 may include paint (e.g., commercially available or proprietary) or other coating that may be applied to a medium and that may glow (e.g., emit light 358 visible to a human operator 38) in response to exposure to a particular frequency range emitted from a "black light" bulb. In addition, permanent ink visible to the unaided human eye may be printed on a portion of the medium. The permanent ink may encode information about the item 300. In another illustration, rather than applying a layer of ink, paint, or coating on the medium, the permanent ink itself may be made of the ink, paint, or coating. Suitable materials for the glowing marker 310 may include fluorophores (alternatively called fluorochromes) that may absorb light energy of a specific wavelength that may cause a shift from a ground state to an excited state in which light may be re-emitted at another (e.g., longer) wavelength. Non-limiting examples of materials that may receive wavelengths in the ultraviolet spectrum (e.g., equal to or less than about 380 nm) and respond by emitting wavelengths in the visible spectrum (e.g., equal to or greater than about 380 nm) may include Hydroxycoumarin, Aminocoumarin, Methoxycoumarin, Alexa Fluor 350, DyLight 350, Hoechst 33342, DAPI, Hoechst 33258, Indo-1, Y66H, Y66F, and Monochlorobimane.

The glowing marker 310 may be calibrated to emit visible light in response to different triggering wavelengths, e.g., so that each glowing marker attached to an item may have a triggering wavelength that may be different from at least one other triggering wavelength for another marker attached to the same or a different item. This variety may permit a particular wavelength or set of wavelengths to be projected toward the items to cause glowing of a specific set of glowing markers that correspond to the wavelength or set of wavelengths projected toward all of the glowing markers.

Light at a particular excitation wavelength may be emitted from a wavelength source. In an example, the management module 15 may control (e.g., instruct) the wavelength source to emit a light at a particular wavelength. In this example, the management module 15 may maintain or access information identifying glowing marker(s) attached with an item and respective excitation wavelengths.

In an example, the wavelength source may be integrated or attached to the handheld device 60. In another example, as illustrated in FIG. 3, a standalone wavelength source 350 may be used. In yet another example, multiple wavelength sources may be utilized to each provide a different set of one or more suitable wavelengths. Generally, the wavelength source 350 may include any suitable components for projecting or emitting different wavelengths for triggering visible light from the glowing marker 310.

For instance, the wavelength source 350 shown in FIG. 3 may include two bulbs 354A and 354B each situated adjacent to rotating wheels that can change which filter 356 (individually shown as filter 356A-356F) may act on projections from the bulbs 354, but any combination of bulbs, filters, lenses, or other features may be used for providing different wavelengths 358 for triggering emission of visible light from the glowing marker 310. In an illustrative example, bulbs including different phosphors may be utilized to emit different varieties of "black light" or ultraviolet wavelengths.

In various embodiments, glowing functionality may be accomplished without a direct line of sight from the wavelength source 350 (and, similarly, from a wavelength source integrated with or attached to the handheld device 60) to the item 300. For example, the visible wavelengths 358 may reflect and refract around obstacles such as an arm of the operator 38 that may otherwise at least occasionally block a direct line of sight between the wavelength source 350 and the item 300. Additionally, in various embodiments, glowing functionality may be achieved without obtaining or utilizing specific information about the location and/or orientation of the item 300 and/or the glowing marker 310. The wavelengths 358 may reach the glowing marker 310 and prompt glowing, regardless of whether the item 300 is presented askew or otherwise out of alignment with an expected orientation relative to the wavelength source 350. This capacity of the glowing marker 310 to illuminate without precise aiming of the wavelengths 358 may allow glowing functionality to be provided without calculation-intensive processes. This may be in contrast to other technologies that require precise aiming of a light source (such as for a laser beam or from an image projector) toward a particular location. Such other technologies may rely on calculation-intensive processes of identifying an exact placement of a target location and aiming the light source so as to solely illuminate that calculated location. In comparison, use of the selectively responsive glowing marker 310 as described herein may allow a target location to be visually identified without the system necessarily first identifying an exact placement of that target location.

In an illustrative operational use case, consider the example of a video game console as the item 300. The glowing marker 310 may encode a UPC of the video game console and may be attached to a surface of the video game console. A second marker 320 (whether regular or glowing at a different wavelength) may also be attached to the surface. This second marker 320 may encode a serial number of the video game console. The management module 15 may instruct the operator 38 to stow the video console in the bin 25 of the inventory holder 30. The instructions may specify that the UPC, rather than the serial number, should be read prior to the stowing. Hence, the management module 15 may selectively control a wavelength source (e.g., the wavelength source 350 or one of the handheld device 60) to emit a light having an excitation wavelength corresponding to the glowing marker 310. In response, the glowing marker 310 may emit visible light, thereby providing a visual identification of the marker that should be read. Thus, the operator 38 may operate the handheld device 60 to read the glowing marker 310. The management module 15 may receive the read including the UPC, confirm that video game console is the correct item to stow, present a positive notification to the operator 38, and log that the video game console may have been stowed in the bin 25.

Turning to FIGS. 4-7, the figures illustrate different configurations of a dynamic marker. As explained herein above, an example of a dynamic marker may include a temporarily unreadable marker that may encode information about an item, where the information may be unreadable (by a human or by a device, such as the handheld device 60 of FIG. 1) for a fading period of time. Depending on the configuration, the information may be encoded by applying a layer of disappearing ink over a medium or another layer of permanent ink. The information may be obstructed by applying a layer of disappearing ink. The fading time period may be a function of the composition of disappearing ink and/or the operational environment (e.g., exposure to carbon dioxide). The medium may be a part of the item (e.g., a portion of a surface of the item) or may be attached to the item via an attachment mechanism (e.g., glued to the surface of the item). Although FIGS. 4-7 illustrate one dimensional barcodes, other types of markers may be possible (e.g., two dimensional barcodes).

Figure 4:
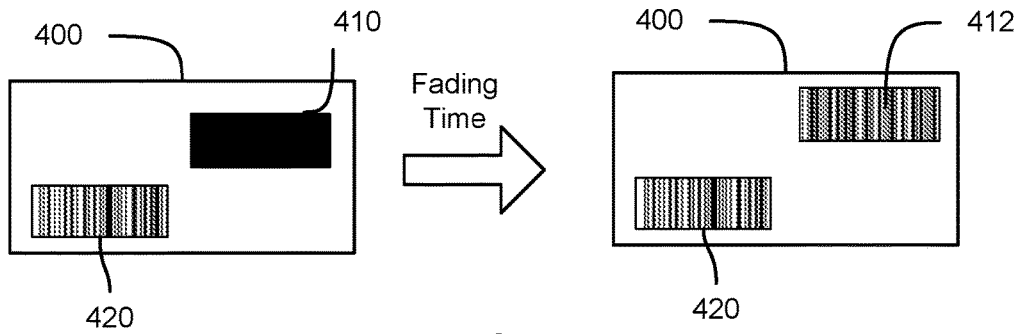
FIG. 4 illustrates an example configuration of a dynamic marker attached to an item, where the dynamic marker may include a layer of disappearing ink according to certain embodiments.

FIG. 4 illustrates an example configuration of a temporarily unreadable marker 410 attached to an item 400 (shown on the left hand side). In this example, a regular marker 420 may also be attached to the item 400 at a different attachment location than that of the temporarily unreadable marker 410. Although FIG. 4 illustrates the two markers 410 and 420 on a same surface of the item 400, other surface distributions may also be possible.

In this example, a layer of permanent ink and a layer of disappearing ink may form at least a portion of the temporarily unreadable marker 410. The permanent ink may be used to encode first information about the item 400. The disappearing ink may be applied over at least a portion of the permanent ink, thereby rendering the first encoded information unreadable for a fading time period. In comparison, the regular marker 420 may encode second information about the item 400, where the second information may be readable independently of the fading time period. For instance, a layer of permanent ink may form the regular marker 420.

Once the fading time period elapses, the disappearing ink of the temporarily unreadable marker 410 may become colorless. Accordingly, the first encoded information may become readable. FIG. 4 illustrates this change on the right hand side, where the temporarily unreadable marker 410 may have become a readable marker 412.

Figure 5:
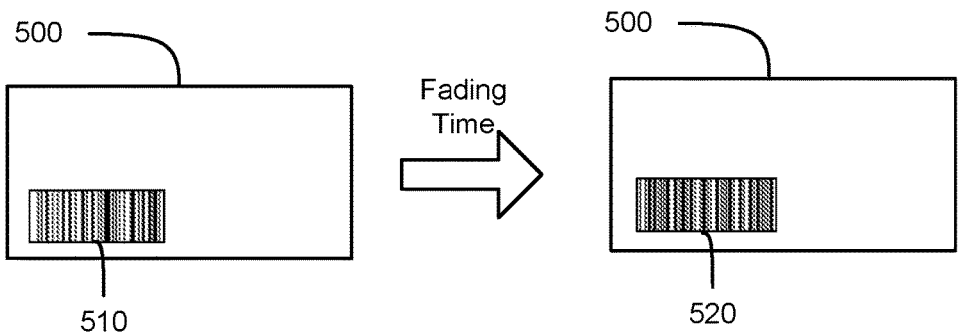
FIG. 5 illustrates another example configuration of a dynamic marker attached to an item, where the dynamic marker may include a layer of disappearing ink according to certain embodiments.

FIG. 5 illustrates another example configuration of a dynamic marker 510 attached to an item 500 (shown on the left hand side). In this example, the dynamic marker 510 may be readable for a fading time period but may obstruct a regular marker 520 during that time period such that the regular marker 520 may be temporarily unreadable. The regular marker 520 (shown on the right hand side) may be attached to the item 500 at the same attachment location of the dynamic marker 510.

In this example, a layer of permanent ink may form the regular marker 520. The regular marker 520 may encode first information about the item 500. A first layer of disappearing ink of a certain color (e.g., red) may be applied over at least a portion of the regular marker 520. A second layer of disappearing ink of a different color (e.g., blue) may be applied over at least a portion of the first layer to encode second information about the item 500 and form the dynamic marker 510. Hence, for the duration of the fading time period, the second encoded information may be readable, whereas the first encoded information may not be readable.

Once the fading time period elapses, the two layers of disappearing ink may become colorless. Thus, the dynamic marker 510 may fade and may no longer obstruct the regular marker 520. The regular marker 520 may become visible. Accordingly, the first encoded information may become readable.

Figure 6:
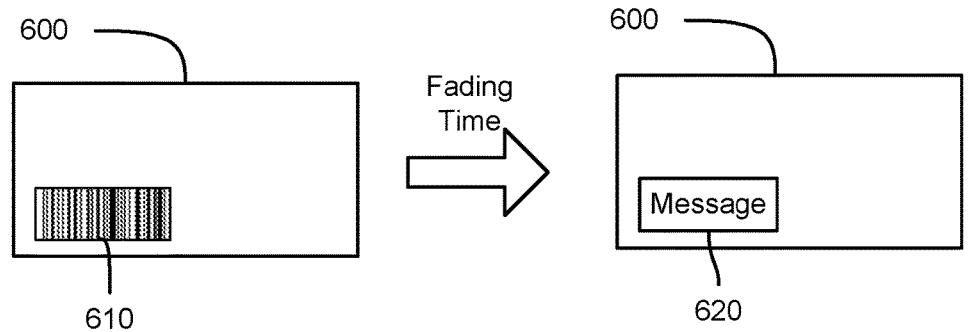
FIG. 6 illustrates yet another example configuration of a dynamic marker attached to an item, where the dynamic marker may include a layer of disappearing ink according to certain embodiments.

FIG. 6 illustrates another example configuration of a dynamic marker 610 attached to an item 600 (shown on the left hand side). In this example, the dynamic marker 610 may be readable for a fading time period but may obstruct a regular marker 620 during that time period such that the regular marker 620 may be temporarily unreadable. The regular marker 620 (shown on the right hand side) may be attached to the item 600 at the same attachment location of the dynamic marker 610.

Unlike the regular marker 520 of FIG. 5, the regular marker 620 may be blank or include a message. The message may be human-readable and may relate to the fading time period. For instance, the message may describe that the fading time period has elapsed, such that the operator may ascertain temporal information about the item 600 from reading the message. For instance, the item 600 may be a grocery item having an expiration date. The message may inform the operator that the grocery item has expired. Similarly, a blank marker may inform the operator that the grocery item has expired.

In this example, a layer of permanent ink may be applied to form the regular marker 620. A first layer of disappearing ink of a certain color (e.g., red) may be applied over at least a portion of the regular marker 620. A second layer of disappearing ink of a different color (e.g., blue) may be applied over at least a portion of the first layer to encode information about the item 600 and form the dynamic marker 610. Hence, for the duration of the fading time period, the encoded information may be readable, whereas the regular marker 620 may not be readable.

Once the fading time period elapses, the two layers of disappearing ink may become colorless. Thus, the dynamic marker 610 may fade and may no longer obstruct the regular marker 620. The regular marker 620 may become visible and, thus, readable.

Figure 7:
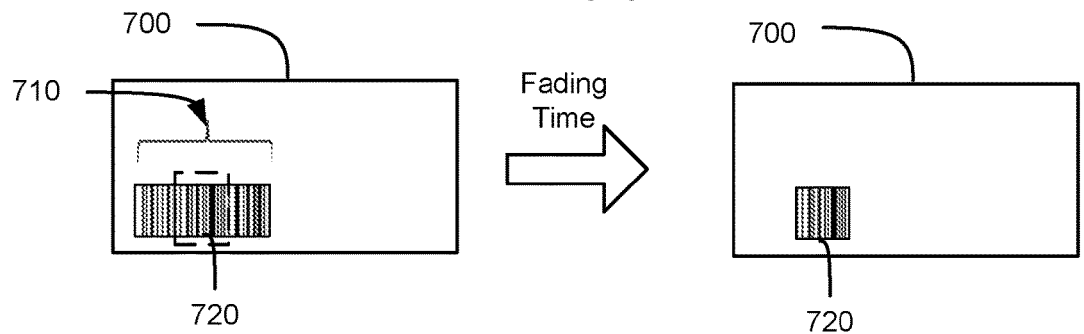
FIG. 7 illustrates a further configuration of a dynamic marker attached to an item, where the dynamic marker may include a layer of disappearing ink according to certain embodiments.

FIG. 7 illustrates another example configuration of a dynamic marker 710 attached to an item 700 (shown on the left hand side). In this example, the dynamic marker 710 may be readable for a fading time period. Rather than obstructing, the dynamic marker 710 may supplement a regular marker 720 for the duration of the fading time period. Hence, prior to the fading time period elapsing, a read of the combination of the dynamic marker 710 and regular marker 720 may result in a read of one set of information. In comparison, post the fading time period elapsing, the dynamic marker 710 may have disappeared. Hence, the read may result in a second set of information (e.g., the information encoded by the regular marker 720).

In this example, a layer of permanent ink may form the regular marker 720. The regular marker 720 may encode first information about the item 700. Disappearing ink may be applied proximate to one or more edges of the regular marker 720. The disappearing ink may form a portion of the dynamic marker 710, while the remaining portion of the dynamic marker 710 may be formed by the permanent ink of the regular marker 720. The dynamic marker 710 may encode second information about the item 700 based on the disappearing ink and the permanent ink.

Hence, for the duration of the fading time period, the second information encoded by the dynamic marker 710 may be readable. Once the fading time period elapses, the disappearing ink may become colorless. Thus, the dynamic marker 710 (or, at least the portion formed by the disappearing ink) may fade. The regular marker 720 may become the visible marker (relative to the two markers 710 and 720). Accordingly, the first encoded information may become readable.

Figure 8:
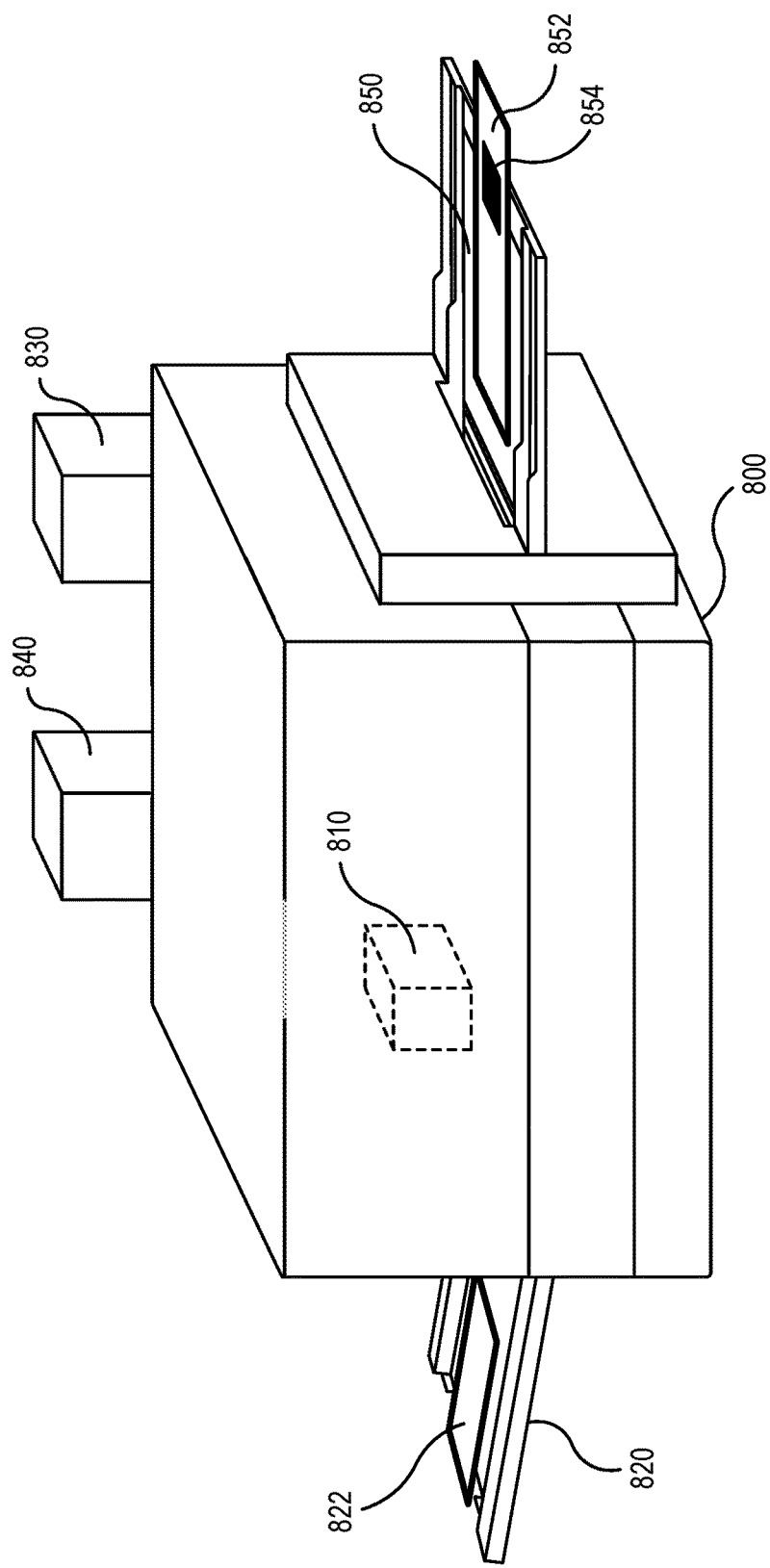
FIG. 8 illustrates a computing system configured to generate dynamic markers according to certain embodiments.

FIG. 8 illustrates a computing system configured to generate dynamic markers. The computing system may include a printer 800 and a number of ink sources. Different types of dynamic markers may be generated based on different inks available from the ink sources. For example, an ink source may hold permanent ink, another ink source may hold a particular composition of disappearing ink (or multiple compositions), while yet another ink source may hold a particular composition of light responsive ink (e.g., ink that may glow in response to UV light). By controlling what ink to apply and the layering of the inks, various configurations of dynamic markers may be achieved.

The printer 800 may include a printer management module 810. The printer management module 810 may be communicatively coupled with the management module 15 of FIG. 1 such that the management module 15 may remotely control and/or instruct operations of the printer 800.

The printer 800 may also include a number of paper sources 820. A number of papers 822 (and, similarly other types of medium) may be loaded for printing through the paper sources. The printer 800 may output papers 852 (and, similarly, other media) at an output tray 850. The outputted papers 852 (and, similarly, other media) may include printed markers 854.

In addition to an ink source storing a number of permanent ink cartridges, the printer 800 may include or interface with a number of other ink sources, such as a disappearing ink source 830 and a light responsive ink source 840. The disappearing ink source 830 may include a number of ink cartridges, each storing a particular composition of disappearing ink. Each of the disappearing ink cartridges may be used to print a layer of disappearing ink having a particular fading time period. In comparison, the light responsive ink source 840 may include a number of ink cartridges, each storing a particular composition of light responsive ink. Each of the light responsive ink cartridges may be used to print a layer of light responsive ink that may glow light (e.g., visible light) in response to emitted light having a particular wavelength (e.g., UV light with a particular wavelength).

The printer management module 810 may control the paper (or medium) type, ink type, layering of the inks, locations of the inks on the paper, patterns formed by the inks, and/or other printing parameters of the printer 800. Some of these controls may be remotely affected by the management module 15 over a data communication network.

Hence, if the management module 15 determines that a book should be printed and packed within two hours, the management module 15 may instruct the printer management module 810 accordingly (e.g., print an ISBN marker and a temporarily dynamic marker) and may provide information about the book (e.g., ISBN, provider identifier, content). In turn, the printer management module 810 may control the printer 800 to print the book by using the proper paper and ink (e.g., by applying disappearing ink with a fading time period of about two hours for the ISBN marker).

In another illustration, if the management module 15 determines that a glowing marker should be printed, where the glowing marker may be responsive to a particular wavelength and encoding specific information about a video game console, the management module 15 may instruct the printer management module 810 accordingly. In turn, the printer management module 810 may control the printer 800 to print the glowing marker with the appropriate light responsive ink such that the glowing marker may encode the information about the video game console and glow in response to emitted light having the particular wavelength. The outputted glowing marker may be subsequently attached to the video game console.

Figure 9:
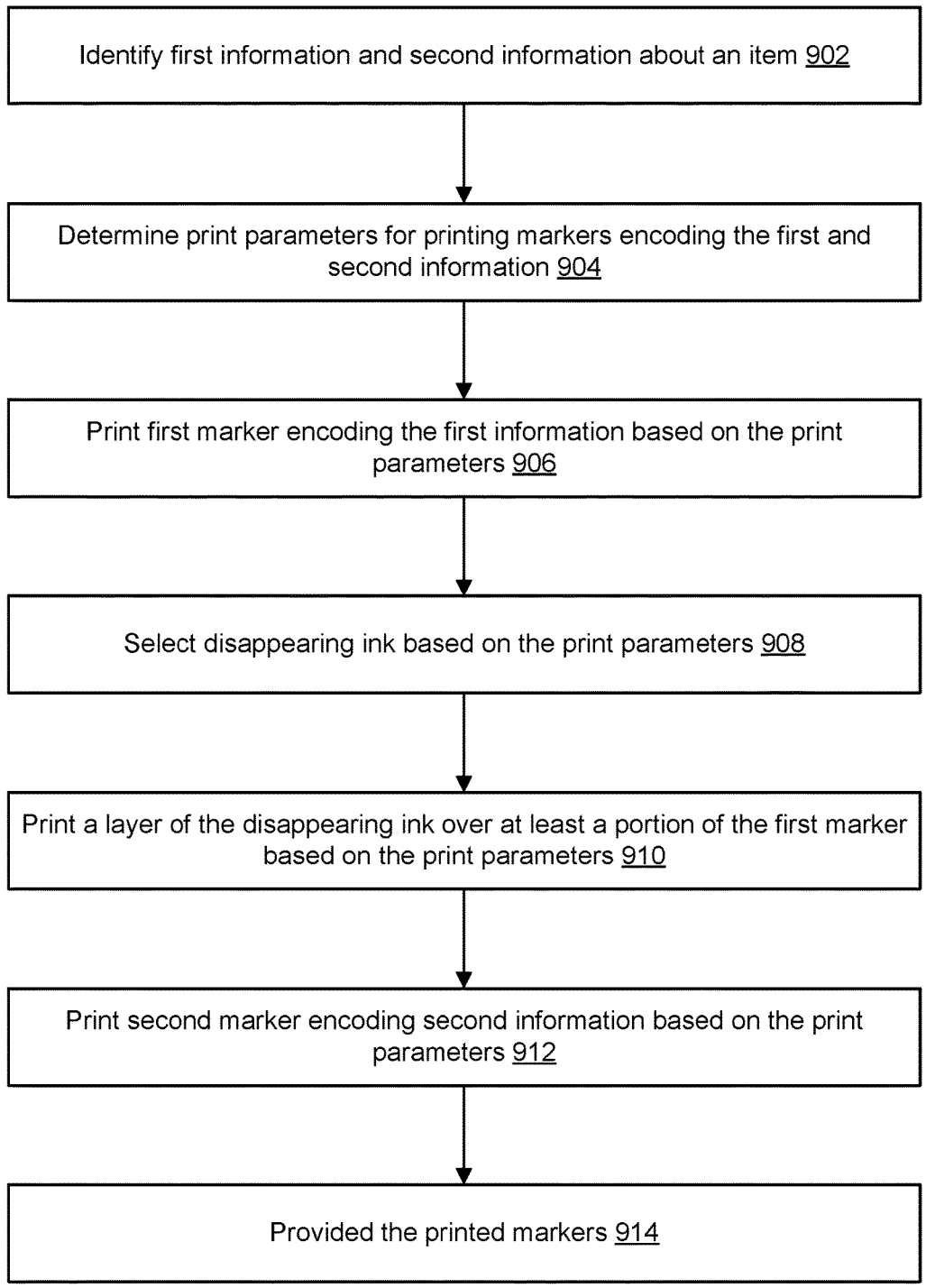
FIG. 9 illustrates an example flow for generating a dynamic marker according to certain embodiments.

FIG. 9 illustrates an example flow for generating a dynamic marker. For instance, the example flow may be performed to print a dynamic parameter including at least one layer of disappearing ink on a medium. A computer system is illustrated as performing operations of the example flow. In an example, the computer system may host a management module (e.g., the management module 15 of FIG. 1 and/or the printer management module 810 of FIG. 8) and may control (locally or remotely) functionalities of a printer (e.g., such as the printer 800 of FIG. 8). Generally, the computer system may include a processor and a memory coupled to the processor. The processor may execute computer-readable instructions stored in the memory. The computer-readable instructions may include instructions for performing the operations. While the operations are illustrated in a particular order, it should be understood that no particular order is necessary and that one or more operations may be omitted, skipped, and/or reordered.

In the interest of clarity of explanation, the example flow describes printing a dynamic marker that includes at least a layer of disappearing ink. The example flow may similarly apply to printing a dynamic marker that may additionally or alternatively include a layer of light responsive ink. Generally, printing a layer of ink may include applying the layer of ink to a surface of a medium. Accordingly, the example flow may similarly apply to applying layers of ink, paint, and/or coating to a medium by using an appropriate printer or other machines for applying ink, paint, and/or coating.

As illustrated, the example flow may start at operation 902, where the computer system may identify first information and second information about an item. For example, the first information may include a first type of a unique identifier of the item (e.g., an ISBN of a book) and the second information may include a second type of the unique identifier (e.g., a provider identifier specific to the item). Other information types may also be possible, such as messages, descriptions, or other item-related information. In an example, the computer system may maintain information about items as part of an inventory system. Such information may be stored in a data store accessible to the computer system.

At operation 904, the computer system may determine print parameters for printing markers, where the markers may include the first and second information. The print parameters may include, for example, the type of medium, location on the medium, ink type, ink color, layering of the inks, and other printing-related parameters. Generally, the print parameters may define configurations of the markers for printing, such as the configurations illustrated in FIGS. 4-7. Some of the print parameters may be predefined based on the item and, thus, may be determined from the information stored in the data store. For example, the medium type and marker locations may be predefined. Other parameters, such as ink type, color, and layering, may also be defined based on the item and/or determined from an inventory action applicable to the item. For example, if the item is a book and the inventory action is to print and pack the item for shipping to a consumer based on a consumer order within a two hour window, the printing parameters may indicate a two marker configuration, such as the one in FIG. 4, where the composition of the disappearing ink may support a fading time period of about two hours. On the other hand, if the item is a frozen grocery item with a four hour expiration if thawed, the printing parameters may indicate a double layering configuration, such as the one in FIG. 6, where the composition may support a fading time period of about four hours to expose an expiration message.

At operation 906, the computer system may print a first marker encoding the first information based on the print parameters. For example, the desired configuration is defined in the print parameters; the first marker may be a regular marker. The computer system may instruct the printer to apply a layer of permanent ink to the medium at a particular location, where this layer may encode the first instruction.

At operation 908, the computer system may select disappearing ink based on the print parameters. For example, depending on the ink color and fading time period, the computer system may identify an ink cartridge that may support such print parameters. Accordingly, the computer system may instruct the printer to use the ink cartridge for printing a layer of the disappearing ink.

At operation 910, the computer system may print a layer of the disappearing ink over at least a portion of the first marker based on the print parameters. For example, the print parameters may specify that the first marker should be completely covered (e.g., as shown in the example configuration of FIG. 4). Accordingly, the computer system may instruct the printer to apply the disappearing ink from the ink cartridge over the location of the first marker. Once applied, the layer of disappearing ink may obstruct the first marker, thereby, rendering the first marker temporarily unreadable.

At operation 912, the computer system may print the second marker based on the print parameters. The second marker may encode the second information. For example, the print parameters may specify that, for the second marker, permanent ink and a non-overlapping location relative to the location of the first marker should be used. In this example, the computer system may instruct the printer to apply permanent ink from an appropriate ink cartridge at the non-overlapping location (which would result in, e.g., the configuration of FIG. 4). In another example, the print parameters may specify that a second layer of disappearing ink should be applied over (to fully or partially cover) at least a portion of the existing layer of disappearing ink.

Accordingly, the computer system may instruct the printer (which would result in, e.g., the configurations of FIGS. 5 and 6).

At operation 914, the printed first and second markers may be provided. For example, the printer may output the medium having the printed markers. The computer system may send a notification to a device or may provide an alert to an operator that the printed markers may be available.

Figure 10:
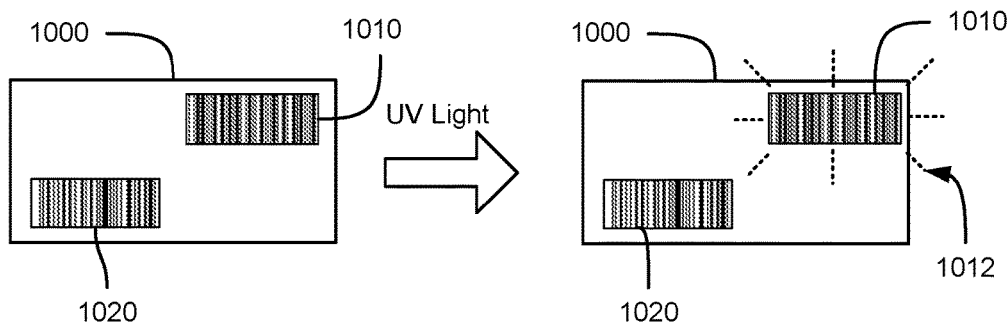
FIG. 10 illustrates an example configuration of a dynamic marker attached to an item according to certain embodiments.
Figure 11:
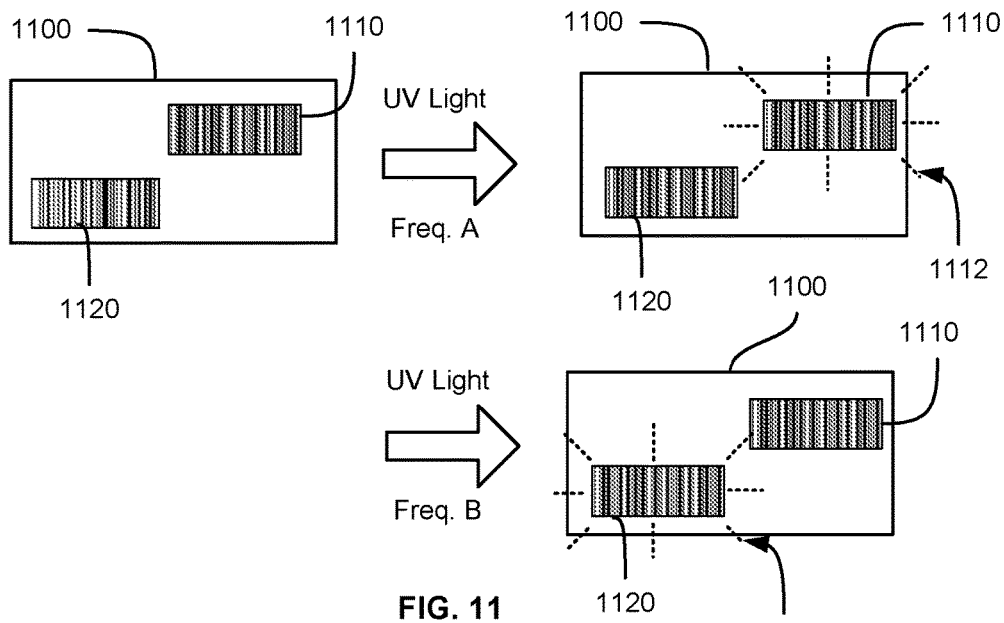
FIG. 11 illustrates an example configuration of dynamic markers attached to an item according to certain embodiments.
Figure 12:
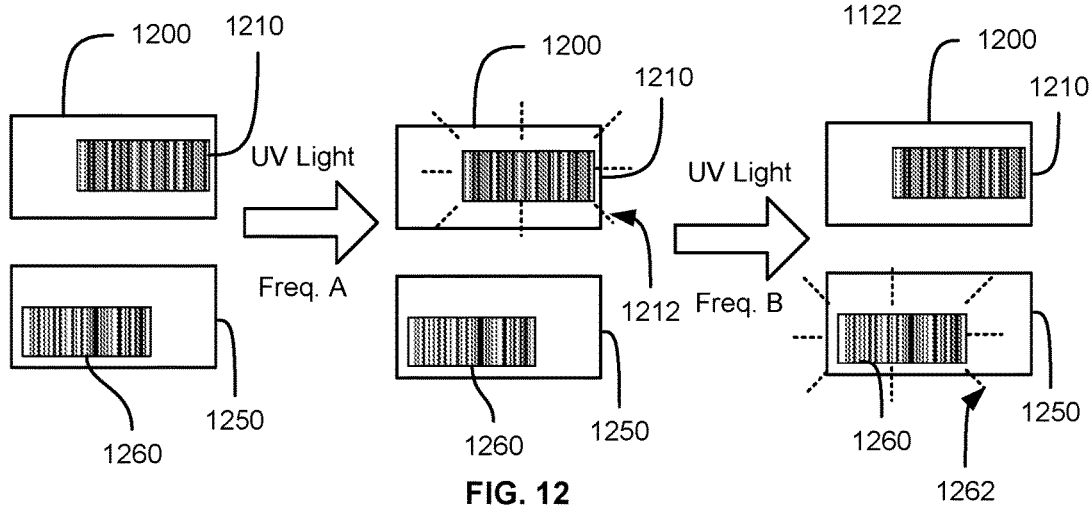
FIG. 12 illustrates an example configuration of dynamic markers, each attached to a different item according to certain embodiments.

Turning to FIGS. 10-12, the figures illustrate different configurations of a dynamic marker. As explained herein above, an example of a dynamic marker may include a glowing marker. The glowing marker may, but need not, encode information about an item. More importantly, the glowing marker may attract the attention of an operator such that the operator may properly identify the item or a surface of the item, position the surface relative to a handheld device (or vice versa) or relative to a fixed device, and/or to identify which marker should be read. FIGS. 10-12 illustrate example glowing marker configurations for facilitating such functionalities. As illustrated, a UV light source (or, similarly, other light source types) may be used to emit light at a particular wavelength towards a glowing marker responsive to that wavelength. The glowing marker need not be in a direct line of sight with the UV light source. In response, the glowing marker may emit light visible to an unaided human eye, thereby attracting the attention of the operator. Although FIGS. 10-12 illustrate one dimensional barcodes, other types of markers may be possible (e.g., two dimensional barcodes). In addition, more than two markers may be present and the distribution of such markers may be at different surfaces of the item(s). Further, other types of dynamic markers may be similarly configured and used. For instance, a dynamic marker that may exhibit a tactile or audible response to an acoustic signal may be used in conjunction with an acoustic signal source.

FIG. 10 illustrates an example configuration of a glowing marker 1010 attached to an item 1000. In this example, a regular marker 1020 may also be attached to the item 1000 at a different attachment location than that of the glowing marker 1010.

In response to emitted UV light, the glowing marker 1010 may emit visible light 1012, whereas the regular marker 1020 may not. The visible light may be of particular properties that may attract the operator's attention. The properties may include, for example, color, intensity, and/or flashing pattern. Some of these properties may be controlled by the light source. For instance, the intensity and flashing pattern may depend on the intensity and flashing pattern, respectively, of the emitted UV light. Similarly, the responsive color may depend on the wavelength (e.g., the glowing marker 1010 may include different paints, each of which may respond with a particular color to a corresponding wavelength). Because the visible light may be emitted, the glowing marker 1010 may attract the operator's attention, whereas the regular marker 1020 may not.

FIG. 11 illustrates an example configuration of glowing markers 1110 and 1120 attached to an item 1100. In this example, each of the glowing markers 1110 and 1120 may respond to emitted light having a particular wavelength. In other words, the glowing marker 1110 may respond to a first wavelength and not a second wavelength, while the glowing marker 1120 may respond to the second wavelength and not the first wavelength. The responses of the glowing markers 1110 and 1120 may be similar (e.g., emitting a visible light of a same or similar color) or may be different (e.g., emitting visible lights of distinguishable colors).

Hence, in response to emitted UV light having the first wavelength (shown in FIG. 11 as having "frequency A"), the glowing marker 1110 may emit visible light 1112, whereas the glowing marker 1120 may not. Thus, the glowing marker 1110 may attract the operator's attention, whereas the glowing marker 1120 may not at the first wavelength. In comparison, in response to emitted UV light having the second wavelength (shown in FIG. 11 as having "frequency B"), the glowing marker 1110 may not respond, whereas the glowing marker 1120 may emit visible light 1122. Thus, the glowing marker 1120 may attract the operator's attention, whereas the glowing marker 1110 may not at the second wavelength.

In this example, the light source may be controlled to selectively emit the proper UV light depending on which of the two glowing markers 1110 and 1120 should be excited for a response. For instance, if an inventory action necessitates a read of a UPC of the item 1100 and if the glowing marker 1110 encodes this information, the light source may emit the UV light having the first wavelength. On the other hand, if the inventory action necessitates a read of a serial number of the item 1100 and if the glowing marker 1120 encodes this information, the light source may emit the UV light having the second wavelength.

FIG. 12 illustrates an example configuration of glowing markers 1210 and 1260, each attached to a different item. For instance, the glowing marker 1210 may be attached to an item 1200, whereas the glowing marker 1260 may be attached to another item 1250. In this example, each of the glowing markers 1210 and 1260 may respond to emitted light having a particular wavelength. In other words, the glowing marker 1210 may respond to a first wavelength and not a second wavelength, while the glowing marker 1260 may respond to the second wavelength and not the first wavelength. The responses of the glowing markers 1210 and 1260 may be similar (e.g., emitting a visible light of a same or similar color) or may be different (e.g., emitting visible lights of distinguishable colors). In this case, by controlling the wavelength of the emitted UV light, one of the glowing markers 1210 and 1260 may respond to the emitted UV light, thereby attracting the operator's attention to one of the items 1200 and 1250. Thus, if an inventory action necessitates a particular sequence for processing (e.g., packing in a same delivery container) the items 1200 and 1250, the UV light source may be operated to sequentially emit the two wavelengths according to the inventory action's sequence.

Hence, in response to emitted UV light having the first wavelength (shown in FIG. 12 as having "frequency A"), the glowing marker 1210 may emit visible light 1212, whereas the glowing marker 1260 may not. Thus, the glowing marker 1210 may attract the operator's attention to the first item 1200, whereas the glowing marker 1260 may not do so for the second item 1250 at the first wavelength. In comparison, in response to emitted UV light having the second wavelength (shown in FIG. 12 as having "frequency B"), the glowing marker 1210 may not respond, whereas the glowing marker 1260 may emit visible light 1262. Thus, the glowing marker 1260 may attract the operator's attention to the second item 1250, whereas the glowing marker 1210 may not do so for the first item 1200 at the second wavelength.

In this example, the light source may be controlled to selectively emit the proper UV light depending on which of the two glowing markers 1210 and 1260 should be excited for a response. For instance, if an inventory action necessitates that the first item 1200 may be placed in a delivery container first and then adding the second item 1250, the light source may emit the UV light having the first wavelength. Upon a confirmation that the first glowing marker 1210 has been read, the light source may thereafter emit the UV light having the second wavelength.

Figure 13:
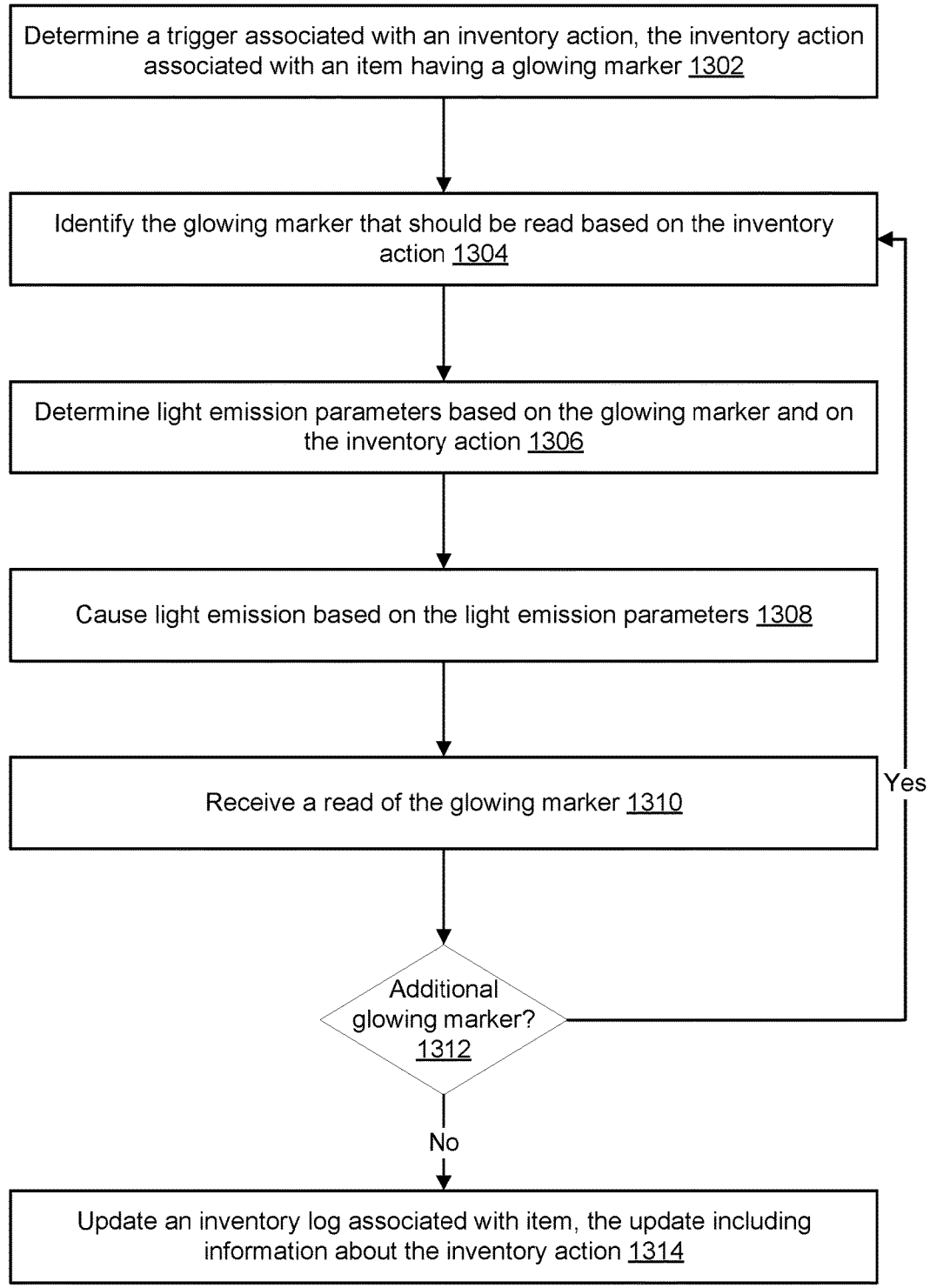
FIG. 13 illustrates an example flow for selectively reading a dynamic marker according to certain embodiments.

FIG. 13 illustrates an example flow for selectively reading a dynamic marker. For instance, the example flow may be performed to excite a particular glowing marker attached to an item and attract an operator's attention and accordingly read the glowing marker. A computer system is illustrated as performing operations of the example flow. In an example, the computer system may host a management module (e.g., the management module 15 of FIG. 1) and may control a light source (e.g., one integrated with the handheld device 60 or the wavelength source 350 of FIG. 3). The computer system may also be communicatively coupled with a handheld device (e.g., the handheld device 60 of FIG. 1) or any other device suitable for reading the glowing marker. Generally, the computer system may include a processor and a memory coupled to the processor. The processor may execute computer-readable instructions stored in the memory. The computer-readable instructions may include instructions for performing the operations. While the operations are illustrated in a particular order, it should be understood that no particular order is necessary and that one or more operations may be omitted, skipped, and/or reordered.

As illustrated, the example flow may start at operation 1302, where the computer system may determine a trigger associated an inventory action. The inventory action may be associated with an item. A glowing marker may be attached to the item. The inventory action may include, for instance, picking, counting, or storing the item, and/or other actions related to inventorying the item or to taking the item out of an inventory. The trigger may indicate that the inventory action should be performed on the item. For instance, the trigger may be a consumer order, a purchase order, a manufacturing order, a stowing order, and/or other causes applicable to the item and triggering the inventory action. In an example, the computer system may be implemented as a part of an inventory system. The computer system may interface with other components of the inventory system, such as with a data store storing information about items, and may determine the trigger and the inventory action based on the interface with such components.

At operation 1304, the computer system may determine the glowing marker that should be read based on the inventory action. For instance, a number of markers may be attached to the item, some of which may be glowing markers. In another illustration, another glowing marker may be attached to another item that may be in proximity to the item and that may have a related inventory action. In an example, the inventory action may be stored in the data store and may include or be associated with information identifying the item, the glowing marker, and/or a light wavelength to which the glowing marker may respond. In this example, the computer system may identify from the data store based on the inventory action and/or an identifier of the item, that the glowing marker should be read.

At operation 1306, the computer system may determine light emission parameters based on the glowing marker and the inventory action. The light emission parameters may include, for example, the light wavelength to which the glowing marker may respond, the time duration for emitting the light having the light wavelength, the intensity of the light, the flashing pattern of the light emission, and/or other parameters related to emitting the light. Some of these parameters may be identified from the data store. For example, the computer system may identify, from the data store, the light wavelength. Other parameters may be additionally or alternatively identified based on the inventory action, the item, and the operator. For instance, each type of an inventory action may be associated with a particular light emission parameter(s) (e.g., flashing pattern). In this illustration, picking the item may necessitate a flashing light emission at a particular flashing frequency. In comparison, stowing the item may necessitate a solid light emission (e.g., no flashing). In another illustration, the type of the item may be associated with a particular light emission parameter(s) (e.g., light intensity). In this illustration, the more fragile the item may be, the more intense the light may be. In yet another illustration, the operator may have a preference(s) for a certain light emission parameter(s) (e.g., the duration of the light emission). In this illustration, the operator may prefer that the light emission lasts for about five seconds. The preference(s) may be stored in a profile of the operator within the inventory system (e.g., at the data store).

At operation 1308, the computer system may cause the light emission based on the light emission parameters. For example, the computer system may control the light source to selectively emit the light having the light wavelength according to the light emission parameters. This control may include instructing, via a network such as a data communication network, the light source to perform the light emission.

At operation 1310, the computer system may receive a read of the glowing marker. For example, the operator may operate the handheld device to read the glowing marker. Once read, the handheld device may send a notification about the read to the computer system. The notification may include information encoded in the glowing marker. The computer system may compare this information to the information about the inventory action to confirm whether the read was a correct read. For instance, the computer system may compare the identifier of the item from the notification to the identifier of the item stored in association with the inventory action. Mismatches may indicate an incorrect read. Conversely, matches may indicate a correct read. The computer system may provide feedback to the operator (e.g., via the handheld device or some other interface device) about whether the read was correct or not.

At operation 1312, the computer system may determine whether an additional glowing marker should be read. This determination may be based on the inventory action and/or the notification received at operation 1310. In an example, the inventory action may involve reading multiple markers (e.g., attached to the same item or to a number of items). In that case, the computer system may determine that at least one additional marker should be read. In another example, if the last notification indicates an incorrect read, the computer system may determine that an additional glowing marker (e.g., the correct one) should be read. If an additional marker should be read, operations 1304-1312 may be iteratively repeated. Otherwise, operation 1314 may be performed.

At operation 1314, the computer system may update an inventory log associated with the item. The update may include information about the inventory action. The inventory log may be stored within the inventory system (e.g., at the data store). For example, the computer system may indicate that the inventory action may have been initiated or may have been performed based on a correct read of the glowing marker and/or a correct sequence of reading multiple glowing markers.

Figure 14:
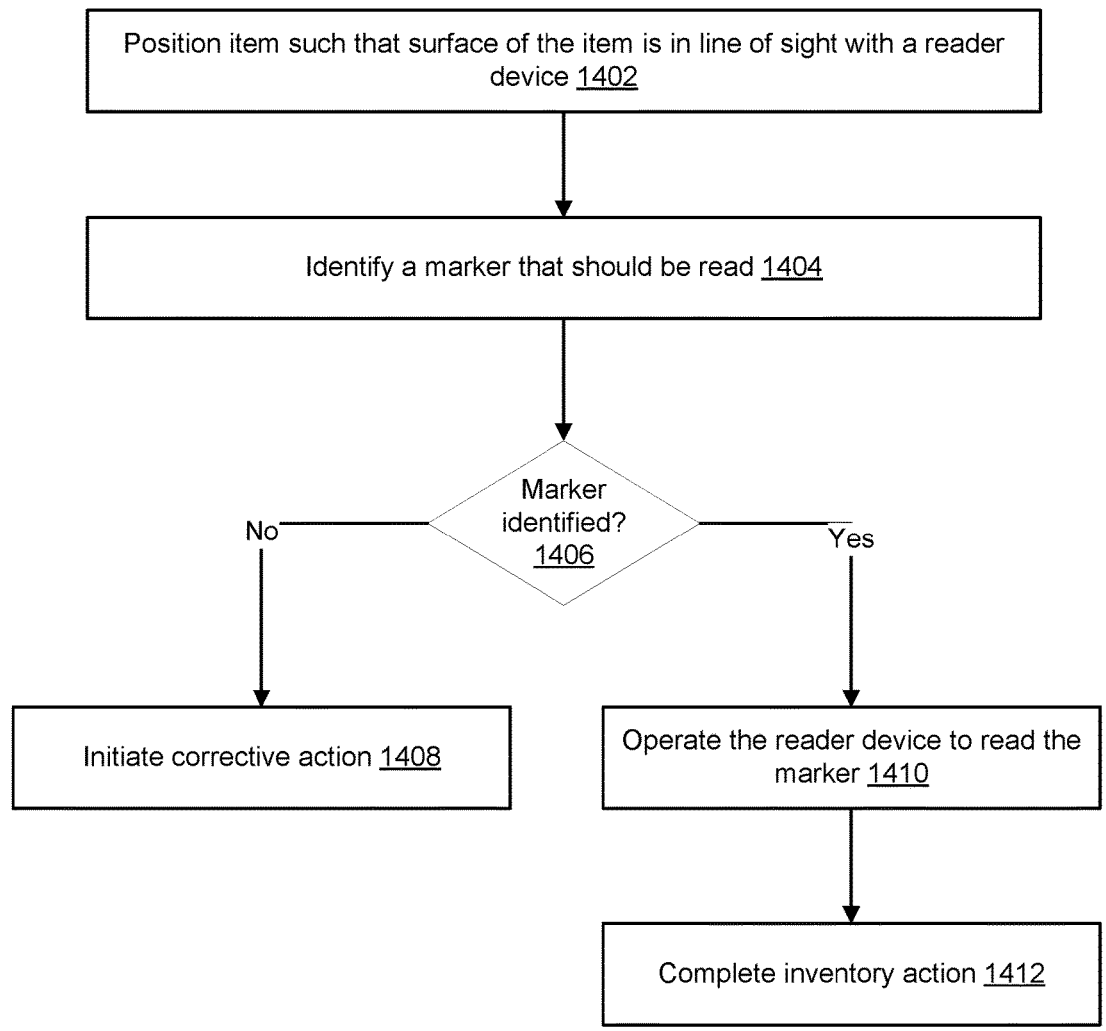
FIG. 14 illustrates an example flow for reading dynamic markers and completing an inventory action according to certain embodiments.

FIG. 14 illustrates an example flow for reading dynamic markers and completing an inventory action. An operator may operate a reader device (e.g. the handheld device 60 or any other device suitable for reading a marker) according to the example flow. The operator may be a human operator or an automated operator.

The example flow may start at operation 1402, where the operator may position the item such that a surface of the item may be in line of sight with the reader device. This positioning may be conducted to complete an inventory action applicable to the item. In an example, a glowing marker may be attached to the surface. Based on an emitted light, the glowing marker may respond with a light response. The light response may attract the operator's attention such that the operator may identify the surface. The operator may accordingly align the surface with the reader device.

At operation 1404, the operator may identify a marker that should be read. In an example, the operator may consider the different markers available on the surface where the glowing marker is attached and make a determination as to which marker should be read. In addition, a management module (e.g., the management module 15) may present at an interface device (e.g., the input device 10 of FIG. 1) and/or the reader device an image of or other information about the marker to help the operator with the determination.

In an example, the marker may be the glowing marker. Accordingly, the operator may identify the marker based on the emitted light from the glowing marker. In another example, the marker may be a different marker attached to the same surface where the glowing marker may be located. In this example, the glowing marker may be used merely for efficient and quick identification and space positioning of the surface. This other marker may be a regular marker or a dynamic marker (e.g., one printed with disappearing ink). In particular, a layer of disappearing ink may be applied to all markers on the surface of the item except for the glowing marker and the other marker, such that all these other markers may be obstructed and the total number of potentially readable markers may be reduced. Hence, the operator may identify the marker as any of the non-glowing markers.

At operation 1406, the operator may determine whether the marker's identification may have been successful or not. If unsuccessful, operation 1408 may be performed to initiate a corrective action. Otherwise, operation 1410 may be followed. Many reasons may exist for an unsuccessful identification in particular when the marker should not be the glowing marker. For instance, no other marker may be available on the surface. In another example, too many markers (e.g., more than two) may be readable from the surface.

At operation 1408, the operator may initiate a corrective action. The type of the corrective action may depend on a number of factors including, for instance, the number of identified markers, if any, and the type of the item. In an example, if no other marker is identified, the operator may input a description of the failure to identify a readable marker at the reader device. An inventory system may collect data related to reading markers of multiple items for subsequent root cause analysis. In another example, if more than two other markers are identified, the corrective action may include reading each of the markers until a positive notification may be received from the management module. In yet another example, if more than two other markers are identified and the item may have been manufactured within an inventory facility, the presence of such a number of markers may indicate that at least one of the markers may have been previously obstructed but may have become readable after a fading time period. In this example, the corrective action may include stopping the inventory action and inputting information about the item at the reader device. In yet another example, if the item is a grocery item and the only identified marker may be blank or include an expiration message, the corrective action may include stopping the inventory action and inputting information about the expiration.

At operation 1410, the operator may operate the reader device to read the marker. The reader device may read information encoded in the marker and transmit this information to the management module. The management module may, in turn, provide a positive notification to the operator via the reader device.

At operation 1412, the operator may complete the inventory action. For example, based on the positive notification, the operator may perform the inventory action (e.g., by placing the item in a bin if the inventory action is to store the item in the bin).

Figure 15:
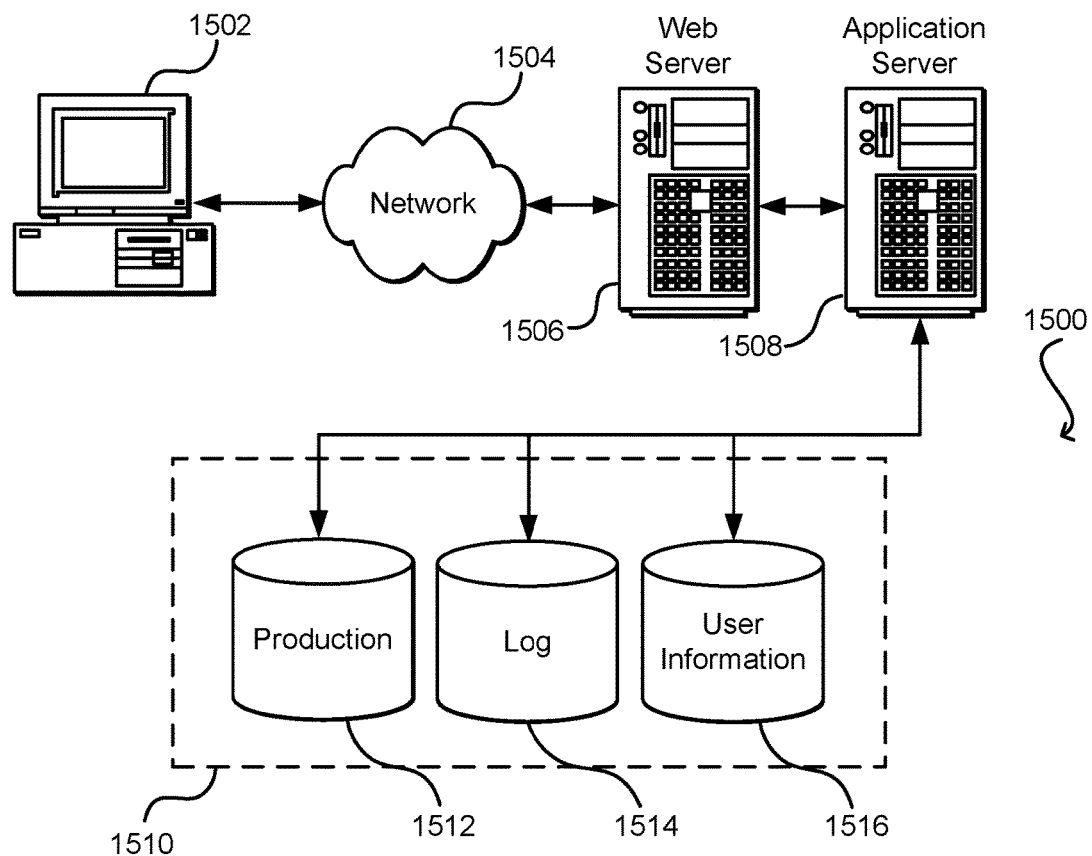
FIG. 15 illustrates an environment in which various features of the inventory system can be implemented, in accordance with at least one embodiment.

FIG. 15 illustrates aspects of an example environment 1500 for implementing aspects in accordance with various embodiments. The example environment 1500 may include components (e.g., computing systems available to host modules and store data) that may be implemented within an inventory system, such as the inventory system 10 of FIG. 1. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system deployed in association with an inventory space, the inventory system comprising:
    an ultraviolet wavelength source configured to emit at least an ultraviolet wavelength;
    a marker attached with an item at an attachment location associated with the item, the item available from the inventory space, the marker encoding information about the item and configured to emit a visible light in response to the ultraviolet wavelength;

a reader configured to read the marker and to trigger an inventory action based at least in part on the information about the item; and a computing management module coupled with the ultraviolet wavelength source and configured to:

determine a trigger associated with reading the marker; and provide, based at least in part on the trigger, instructions that cause the ultraviolet wavelength source to emit the ultraviolet wavelength, wherein an emission of the visible light by the marker in response to an emission of the ultraviolet wavelength causes a visible indication of the attachment location relative to an orientation of the item in space, and wherein a read of the marker by the reader is based at least in part on the visible indication of the attachment location.

2. The inventory system of claim 1, wherein the marker is attached to a surface of a container containing the item, wherein the visible indication of the attachment location identifies the surface where the marker is attached, wherein one or more surfaces of the container comprise a plurality of markers, and wherein a second marker of the plurality of markers does not emit the visible light in response to the ultraviolet wavelength.

3. The inventory system of claim 1, wherein the ultraviolet wavelength source is integrated with the reader.

4. The inventory system of claim 1, wherein the ultraviolet wavelength source is separate from the reader, wherein the ultraviolet wavelength source and the reader are located at a station within the inventory space.

5. A computer-implemented method, comprising:

determining, under instructions of a computing management module of an inventory system, a trigger associated with causing an inventory action based at least in part on a marker attached with an item available from an inventory space, the marker encoding information about the item and configured to present, in response to receiving a non-visible light wavelength, a visible indication of an attachment location of the marker; and causing, under the instructions of the computing management module and based at least in part on the trigger, a light source to emit the non-visible light wavelength, wherein an emission of the non-visible light wavelength causes the marker to respond with the visible indication of the attachment location, wherein a read of the information encoded in the marker by a reader of the inventory system is based at least in part on the visible indication of the attachment location, and wherein the read triggers the inventory action associated with the item based at least in part on the information encoded in the marker about the item.

6. The computer-implemented method of claim 5, wherein the non-visible light wavelength comprises an ultraviolet wavelength, wherein causing the marker to response with the visible indication comprises causing an emission of a visible light from the marker, wherein the light source is coupled with the computing management module and is configured to at least emit the ultraviolet wavelength, wherein the marker is attached to a surface of a container containing the item, wherein the visible indication of the attachment location indicates the surface relative to an orientation of the container in space.

7. The computer-implemented method of claim 5, wherein causing the marker to response with the visible indication comprises causing an emission of a visible light from the marker, wherein a plurality of markers are attached to the item or to a container containing the item, wherein a second marker of the plurality of markers is configured to emit a second visible light in response to receiving a second non-visible light wavelength and to not emit the visible light in response to receiving the non-visible light wavelength.

8. The computer-implemented method of claim 7, wherein the light source is configured to selectively emit a plurality of different non-visible light wavelengths, and further comprising:

selecting, under the instructions of the computing management module, the marker from the plurality of markers based at least in part on a selection parameter associated with the inventory action;

identifying, under the instructions of the computing management module, that the marker is responsive to the non-visible light wavelength; and sending, under the instructions of the computing management module, an identifier of the non-visible light wavelength to the light source.

9. The computer-implemented method of claim 8, wherein the selection parameter comprises a sequence of reading the marker and the second marker.

10. The computer-implemented method of claim 9, wherein the sequence identifies that the marker should be read prior to reading the second marker, and further comprising:

determining, under the instructions of the computing management module and based at least in part on the read of the marker by the reader, that the marker was read; and sending, under the instructions of the computing management module, a second identifier of the second non-visible light wavelength to the light source, the second identifier causing a second emission of the second non-visible light wavelength by the light source.

11. The computer-implemented method of claim 5, wherein the marker is attached to an outer surface of the item, wherein additional markers are attached to respective outer surfaces of the item and do not present visible indications of respective attachment locations in response to receiving the non-visible light wavelength, and wherein the visible indication by the marker and the lack of visible indication by the additional markers facilitate an identification of the outer surface where the marker is attached.

12. The computer-implemented method of claim 5, wherein the light source is configured to selectively emit a plurality of different non-visible light wavelengths toward a station within the inventory space, wherein the item and a second item are located at the station, wherein a second label is attached with the second item and is configured to present a second visible indication in response to receiving a second non-visible light wavelength of the plurality of different non-visible light wavelengths, and further comprising:

selecting, under the instructions of the computing management module, the marker based at least in part on a selection parameter associated with the inventory action;

identifying, under the instructions of the computing management module, that the marker is responsive to the non-visible light wavelength; and sending, under the instructions of the computing management module, an identifier of the non-visible light wavelength to the light source.

13. The computer-implemented method of claim 12, wherein the inventory action comprises placing the item and the second item in a container destined to a delivery destination, and wherein the selection parameter comprises a sequence of placing the item and the second item in the container.

14. The computer-implemented method of claim 13, further comprising:
determining, under the instructions of the computing management module, an indication of a placement of the item in the container based at least in part on the read of the marker by the reader; and
sending, under the instructions of the computing management module, a second identifier of the second non-visible light wavelength to the light source based at least in part on the indication of the placement, the second identifier causing a second emission of the second non-visible light wavelength by the light source.

15. The computer-implemented method of claim 5, wherein the light source is configured to selectively emit a plurality of different non-visible light wavelengths toward a station within the inventory space, and wherein the trigger associated with reading the marker comprises a receipt of the item at the station.

16. One or more non-transitory computer-readable storage media comprising instructions that, upon execution with a processor of an inventory system, cause the inventory system to perform operations comprising:
determining that an item is available from a station of an inventory space;
determining that a marker attached with the item should be read at the station by a reader of the inventory space to trigger an inventory action associated with the item, the marker encoding information about the item and configured to emit a visible light in response to receiving a non-visible light wavelength; and
causing a light source to emit the non-visible light wavelength,
wherein an emission of the visible light by the marker in response to an emission of the non-visible light wavelength by the light source causes a visible indication of an attachment location of the marker, wherein a read of the marker by the reader is based at least in part on the visible indication of the attachment location, and wherein the read triggers the inventory action at the station based at least in part on the information encoded in the marker about the item.

17. The one or more non-transitory computer-readable storage media of claim 16, wherein the marker is configured to emit the visible light in a first visible light wavelength, and wherein the marker is further configured to emit a second visible light in a second visible light wavelength in response to receiving a second non-visible light wavelength.

18. The one or more non-transitory computer-readable storage media of claim 17, wherein the operations further comprise:
causing the light source to emit the non-visible light wavelength and the second non-visible light wavelength in at least one of: a pattern, a sequence, or in conjunction.

19. The one or more non-transitory computer-readable storage media of claim 16, wherein the non-visible light wavelength comprises an ultraviolet wavelength, wherein the marker comprises:
a medium;
a layer of permanent ink applied to at least a portion of the medium, the layer encoding information about the item available from the inventory space; and
a layer of coating configured to emit the visible light in response to receiving the ultraviolet wavelength.

20. The one or more non-transitory computer-readable storage media of claim 19, wherein the information comprises a barcode that identifies the item, and further comprising a layer of disappearing ink applied over at least a portion of the layer of the permanent ink, wherein the layer of disappearing ink obstructs the portion of the layer of the permanent ink for a time period and disappears upon an elapse of the time period.

* * * * *